（12) United States Patent
Weber

(10) Patent No.: US 10,611,423 B2
(45) Date of Patent: Apr. 7, 2020

(54) CLADDING ASSEMBLY FOR A MOTOR VEHICLE

(71) Applicant: Bayerische Motoren Werke Aktiengesellschaft, Munich (DE)

(72) Inventor: Marc Weber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 51 days.

(21) Appl. No.: 15/970,039

(22) Filed: May 3, 2018

(65) Prior Publication Data

US 2018/0251179 A1    Sep. 6, 2018

Related U.S. Application Data

(63) Continuation of application No. PCT/EP2016/070927, filed on Sep. 6, 2016.

(30) Foreign Application Priority Data

Nov. 5, 2015  (DE) .................. 10 2015 221 678

(51) Int. Cl.
*B62J 17/00*    (2020.01)
*B62K 19/00*   (2006.01)

(52) U.S. Cl.
CPC ............. *B62J 17/00* (2013.01); *B62K 19/00* (2013.01)

(58) Field of Classification Search
CPC .................................. B62K 19/00; B62J 17/00
See application file for complete search history.

(56) References Cited

U.S. PATENT DOCUMENTS

2011/0148149 A1    6/2011  Hayashi et al.

FOREIGN PATENT DOCUMENTS

| CN | 101007552 A | 8/2007 | |
|---|---|---|---|
| CN | 201842179 U | 5/2011 | |
| CN | 102101506 A | 6/2011 | |
| DE | 102016201521 A1 * | 8/2017 | ............. B62J 17/00 |
| EP | 2 336 012 A1 | 6/2011 | |
| EP | 2 644 488 A1 | 10/2013 | |

(Continued)

OTHER PUBLICATIONS

English translation of Chinese Office Action issued in counterpart Chinese Application No. 201680038550.X dated Apr. 28, 2019 (eight (8) pages).

(Continued)

*Primary Examiner* — D Glenn Dayoan
*Assistant Examiner* — Melissa Ann Bonifazi
(74) *Attorney, Agent, or Firm* — Crowell & Moring LLP

(57) ABSTRACT

A cladding assembly for a motor vehicle, in particular for a motorcycle or a motorcycle-like motor vehicle, has at least two flat cladding elements. The first cladding element has a first exterior, and the second cladding element has a second exterior which form at least one part of an outer cladding of the motor vehicle in the assembled state and which are arranged adjacently and are separated from each other by a joint. The first cladding element has a transition section which is angled by a first angle relative to the first exterior and at least one first end of the first cladding element extends below the second cladding element. The second cladding element has a bevel which is formed parallel to the transition section at a second end facing the transition section.

13 Claims, 2 Drawing Sheets

(56) References Cited

FOREIGN PATENT DOCUMENTS

| | | |
|---|---|---|
| JP | 9-104380 A | 4/1997 |
| JP | 2002-68045 A | 3/2002 |

OTHER PUBLICATIONS

International Search Report (PCT/ISA/210) issued in PCT Application No. PCT/EP2016/070927 dated Nov. 25, 2016 with English translation (seven pages).
German-language Written Opinion (PCT/ISA/237) issued in PCT Application No. PCT/EP2016/070927 dated Nov. 25, 2016 (six pages).
German-language Search Report issued in counterpart German Application No. 10 2015 221 678.0 dated Aug. 3, 2016 with partial English translation (12 pages).

* cited by examiner

CLADDING ASSEMBLY FOR A MOTOR VEHICLE

CROSS REFERENCE TO RELATED APPLICATIONS

This application is a continuation of PCT International Application No. PCT/EP2016/070927, filed Sep. 6, 2016, which claims priority under 35 U.S.C. § 119 from German Patent Application No. 10 2015 221 678.0, filed Nov. 5, 2015, the entire disclosures of which are herein expressly incorporated by reference.

BACKGROUND AND SUMMARY OF THE INVENTION

The invention relates to a cladding assembly for a motor vehicle, in particular a motorcycle or a motorcycle-like motor vehicle, having at least two flat cladding elements.

In vehicle manufacturing, the fastening of cladding parts to the vehicle constitutes a particular challenge. Between two adjacent cladding parts, a gap is customarily provided, the width of which is referred to as the gap size and is an important factor for structural aspects, but also for the aerodynamics of the vehicle. Uniform gap sizes which are as small as possible are difficult to achieve because of tolerances which occur, particularly in series manufacturing, and are a particular characteristic of qualitatively high-value vehicles since, for this purpose, a complicated coordination of the adjacent components has to be obtained and tolerances which are as small as possible have to be satisfied in a reproducible manner.

If gap sizes are selected to be too small, there is the risk that the cladding parts cannot be fitted or will come into frictional contact with each other, as a result of which stresses in the cladding parts and an annoying production of noise can be observed. In general, even the very smallest differences in parallelism and joint size may lead to undesirable aerodynamic and aero-acoustic phenomena and, moreover, can be easily recognized with the naked eye when looking perpendicularly to the surface of the components.

It is therefore the object of the invention to provide a vehicle cladding with a corresponding gap which overcomes the disadvantages mentioned above and permits as simple and reproducible an assembly as possible.

This and other objects are achieved according to the invention with a cladding assembly for a motor vehicle, in particular for a motorcycle or a motorcycle-like motor vehicle, comprising at least two flat cladding elements, wherein a first cladding element has a first outer surface and a second cladding element has a second outer surface. These outer surfaces, in the assembled state, form at least part of an outer cladding of the motor vehicle and are arranged next to each other and are separated from each other by a gap. The first cladding element has a transition portion which is formed in a manner angled by a first angle with respect to the first outer surface and is extended at least at a first end under the second cladding element, wherein the second cladding element has, at a second end facing the transition portion, a bevel which is formed parallel to the transition portion.

The transition portion is formed between two adjacently arranged cladding elements of the motor vehicle, i.e. in the region of the gap formed in this manner on one of the two cladding elements. Said transition portion extends at least in the region of its outer end, i.e. the end facing away from the first outer surface, under the other second cladding element, thus giving rise to an overlapping region in which the second cladding element is arranged above the transition portion (with respect to a viewing direction of the vehicle from the outside), or the transition portion is arranged under the second cladding element.

Owing to the parallelism of the transition portion, which extends away from the rest of the first cladding element at the first angle, and of the bevel provided on the second cladding element, a gap is produced which is oriented at the same angle at least in this region. This arrangement affords the advantage that said gap is not completely viewable from the outside. This should be understood in such a manner that, in a view perpendicular to the outer surfaces, it is not possible to view the bottom of the gap or through the entire gap. Instead, only part of the transition portion positioned by the first angle can be seen.

Because of the parallelism described between the transition portion and bevel, this makes possible a simple compensation for the position of the two cladding elements relative to each other can be undertaken by the cladding elements being displaced, for example, against each other or vertically with respect to each other in order to compensate for possible tolerances without the gap changing in its orientation itself. This arrangement even affords the possibility that, in the event of a mutual displacement of the cladding elements resulting in the parallelism of the transition portion and bevel, the geometry of the gap, in particular the gap size, is maintained.

In every case, the gap continues to remain unviewable. In addition, because of the unviewable, obliquely running gap, aero-acoustic and aerodynamic influences are reduced since, depending on the flow direction and width of the gap, a flow can more easily flow into the gap or can flow beyond said gap.

Furthermore, the second cladding element can have a wall thickness d in the region of the second end and outside the bevel, wherein the second end of the second cladding element and the first end of the transition portion are designed in a manner overlapping with each other, and an overlapping length is at least d/2.

This means that the second cladding element and the transition portion overlap with the first and the second end in such a manner that an overlapping region formed by this means has the overlapping length l of at least half the wall thickness of the second cladding element, i.e. d/2. This minimum amount ensures that the mentioned properties of the gap which is produced can be provided to a particularly advantageous extent. The wall thickness d should be understood here as meaning a wall thickness of the second cladding element at the second end without taking into account the tapering of the wall thickness produced by the bevel there.

According to further embodiments, the second outer surface can be arranged in an extension with respect to the first outer surface or offset parallel with respect thereto. This means that the first and second outer surface are arranged next to each other in such a manner that they each constitute the extension of the other outer surface, and therefore define a common and continuous outer surface, which surfaces are separated from each other only by the gap produced between the two cladding elements. In this connection, the outer surfaces can be, for example, of plane design in order to form a common plane surface. However, according to an alternative exemplary embodiment, the two outer surfaces can each also be of curved design and can form a common curved surface.

The alternative parallel spacing should be understood in such a way that the second outer surface itself does not constitute the extension of the first outer surface, but rather is arranged parallel to the (imaginary) extension of the latter and therefore parallel to, but offset with respect to, the first outer surface. Consequently, a step is produced between the first outer surface and the second outer surface. Also in this case, for example, a plane or a curved design of the outer surfaces, as described above, is possible.

Furthermore, the transition portion can enclose a first angle of between $130° \leq \alpha \leq 170°$, preferably of between $140° \leq \alpha \leq 160°$, with the first outer surface. Accordingly, the first angle should be understood as the angle which is in each case smaller in terms of amount between the first outer surface and the transition portion, which is angled with respect thereto. With the value ranges mentioned, a particularly advantageously designed configuration of the gap which is produced can be observed which also minimizes the flow-induced interfering influences.

A surface portion which is arranged angled about a second angle with respect to the transition portion can optionally be formed at the first end of the transition portion. This surface portion should be understood as an additional extension of the transition portion which adjoins the first end of the transition portion and can continue under the second cladding element in order, for example, to bring about improved stiffening of the first cladding element.

The second angle is preferably selected in such a manner that the angling is oriented in the opposite direction to the (first) angling of the transition portion and therefore at least partially reduces said (first) angling. In particular, the surface portion can substantially have a profile formed parallel to a conceptual extension of the first outer surface.

Furthermore, it is possible that the transition portion and/or the surface portion are/is formed integrally with the first cladding element.

The cladding assembly described is basically suitable for all types of motor vehicles. These should be understood as including in particular single-track or two-track vehicles, such as, for example, passenger vehicles, trucks, motorcycles or motorcycle-like vehicles, such as scooters, scooters with two, three or four wheels, trikes, and quads.

For example, the surface portion can enclose a second angle of between $130° \leq \beta \leq 170°$, preferably of between $140° \leq \beta \leq 160°$, with the transition portion. The second angle should accordingly be understood as the angle which is in each case smaller in terms of amount between the transition portion and the surface portion which is angled with respect thereto.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
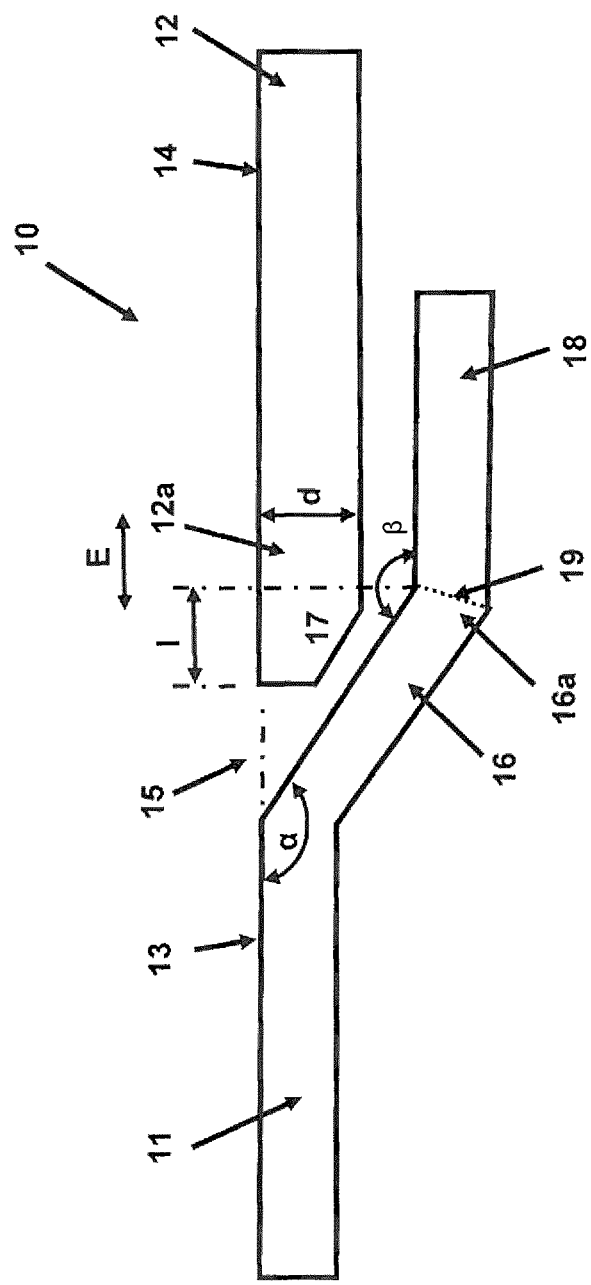
FIG. 1 is a schematic diagram of a first embodiment of a cladding assembly according to the description.

FIG. 1 depicts a first embodiment of a cladding assembly 10 in a schematic illustration which is not to scale. The cladding assembly 10 can be, for example, a cladding assembly of a motor vehicle (not illustrated), in particular of a motorcycle or a motorcycle-like motor vehicle. Two flat cladding elements 11, 12 are merely partially illustrated, wherein a first cladding element 11 has a first outer surface 13 and the second cladding element 12 has a second outer surface 14. These outer surfaces 13, 14, in the assembled state, form part of an outer cladding of the motor vehicle. For this purpose, the two cladding elements 11, 12 are arranged next to each other and are separated from each other by a joint 15. The first cladding element 11 has a transition portion 16 which is formed in a manner angled about a first angle α with respect to the first outer surface 13 and is extended with a first end 16a under the second cladding element 12. The second cladding element 12 has, at a second end 12a facing the transition portion 16, a bevel 17 which is formed parallel to the transition portion 16. This means that a surface portion of the second cladding element 12, which surface portion is formed by the bevel 17, and a surface of the transition portion 16, which surface faces the bevel 17, are formed parallel to each other.

The second cladding element 12 has a wall thickness d in the region of the second end 12a and outside the bevel 17, wherein the second end 12a of the second cladding element 12 and the first end 16a of the transition portion 16 are formed in a manner overlapping with each other, and define an overlapping region with an overlapping length l of at least d/2. According to FIG. 1, the overlapping length l is measured from an outermost tip of the second end 12a up to including the first end 16a, even in the case in which the first end 16a, as likewise illustrated in FIG. 1, is connected to the further surface portion 18, which is described in more detail below.

In the embodiment illustrated, the second outer surface 14 is arranged in an extension with respect to the first outer surface 13. Alternatively, although not illustrated, a spacing offset in parallel with respect to said first outer surface 13 is possible.

The transition portion 16 preferably encloses a first angle α of between $130° \leq \alpha \leq 170°$, preferably of between $140° \leq \alpha \leq 160°$, with the first outer surface 13.

Furthermore, the additional surface portion 18 which has already been mentioned and which is arranged in a manner angled by a second angle β with respect to the transition portion 16 is formed at the first end 16a of the transition portion 16. The surface portion 18 encloses the second angle β of between $130° \leq \beta \leq 170°$, preferably of between $140° \leq \beta \leq 160°$, with the transition portion 16. The second angle β is selected here in such a manner that the surface portion 18 substantially has a profile formed offset parallel to the first outer surface 13 and optionally a profile formed offset parallel with respect to the second outer surface 14. This means that the first angle α corresponds in terms of amount to the second angle β, and therefore the angling of the transition portion 16 in relation to the first outer surface 13 and the angling of the surface portion 18 in relation to the transition portion 16 cancel each other out.

The transition portion 16 and the surface portion 18 can preferably be formed integrally with the rest of the first cladding element 11 and therefore also with each other. For better understanding of the individual portions 16, 18, a conceptual delimitation between the transition portion 16 and the surface portion 18 in the form of a dotted line 19 is illustrated merely schematically and by way of example.

Figure 2:
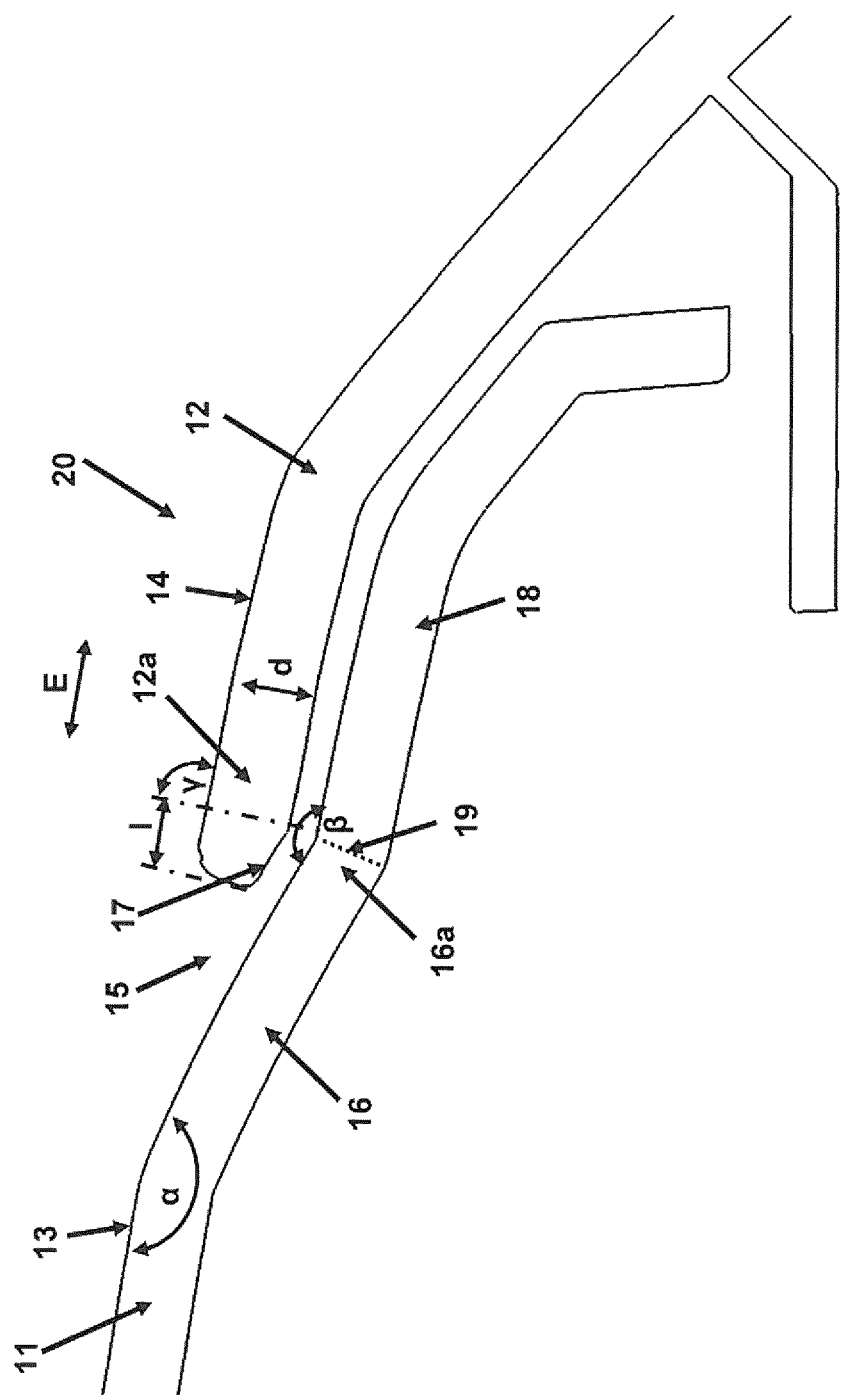
FIG. 2 is a schematic diagram of a second embodiment of the cladding assembly according to the description.

FIG. 2 shows a second embodiment of the cladding assembly 20 according to the description. This cladding assembly is configured substantially comparably to the cladding assembly 10 according to the first embodiment illustrated in FIG. 1, and therefore reference can be made to the description provided there and the identical reference signs can be used for comparable components. However, in contrast to the first exemplary embodiment, the first outer surface 13 and second outer surface 14 are each configured in a curved manner.

Also in this embodiment, the bevel 17 facing the transition portion 16 is formed parallel to the transition portion 16.

The wall thickness d of the second cladding element 12 can likewise be determined in the region of the second end 12*a* and outside the bevel 17, wherein the second end 12*a* of the second cladding element 12 and the first end 16*a* of the transition portion 16 are formed in a manner overlapping with each other in an overlapping region, and an overlapping length l is at least d/2. In the embodiment illustrated, the limits of the overlapping region with the overlapping length l can be determined substantially perpendicularly (angle γ=approx. 90°) to a (local) direction of extent E of the second cladding element 12. The direction of extent E can be in particular identical to the direction in which the second outer surface 14 runs.

The surface portion 18, as illustrated in FIG. 2, can optionally have a likewise curved and angled profile and/or can be designed as a flange in order to be connected in a form-fitting, integrally bonding and/or force-fitting manner, for example, to a likewise optional connecting portion of the second cladding element 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cladding assembly for a motor vehicle, comprising:
   at least two flat cladding elements, wherein
   a first cladding element has a first outer surface and a second cladding element has a second outer surface, which outer surfaces, in an assembled state, form at least part of an outer cladding of the motor vehicle and are arranged next to each other and are separated from each other by a gap having a uniform gap size,
   the first cladding element has a transition portion which is angled by a first angle with respect to the first outer surface and is extended at least at a first end under the second cladding element, and
   the second cladding element has, at a second end facing the transition portion, a bevel which is parallel to the transition portion.

2. The cladding assembly as claimed in claim 1, wherein
   the second cladding element has a wall thickness d in a region of the second end and outside the bevel, and
   the second end of the second cladding element and the first end of the transition portion overlap with each other, and an overlapping length is at least d/2.

3. The cladding assembly as claimed in claim 2, wherein the second outer surface is arranged in an extension with respect to the first outer surface or offset parallel with respect thereto.

4. The cladding assembly as claimed in claim 1, wherein the second outer surface is arranged in an extension with respect to the first outer surface or offset parallel with respect thereto.

5. The cladding assembly as claimed in claim 1, wherein the first angle is selected between 130°≤α≤170°.

6. The cladding assembly as claimed in claim 1, wherein the first angle is selected between 140°≤α≤160°.

7. The cladding assembly as claimed in claim 1, wherein a surface portion which is arranged in a manner angled by a second angle with respect to the transition portion is formed at the first end of the transition portion.

8. The cladding assembly as claimed in claim 7, wherein the second angle is selected between 130°≤β≤170°.

9. The cladding assembly as claimed in claim 7, wherein the second angle is selected between 140°≤β≤160°.

10. The cladding assembly as claimed in claim 7, wherein the surface portion substantially has a profile parallel to the second outer surface.

11. The cladding assembly as claimed in claim 1, wherein the transition portion is formed integrally with the first cladding element.

12. The cladding assembly as claimed in claim 7, wherein the transition portion and/or the surface portion are/is formed integrally with the first cladding element.

13. The cladding assembly as claimed in claim 1, wherein the two cladding elements form a motorcycle cladding.

* * * * *